UNITED STATES PATENT OFFICE.

OSCAR BALLY, OF MANNHEIM, GERMANY, ASSIGNOR TO BADISCHE ANILIN & SODA FABRIK, OF LUDWIGSHAFEN-ON-THE-RHINE, GERMANY, A CORPORATION.

HALOGENATED VAT DYES AND PROCESS OF MAKING SAME.

1,026,621.   Specification of Letters Patent.   Patented May 14, 1912.

No Drawing.   Application filed January 20, 1911.   Serial No. 603,736.

*To all whom it may concern:*

Be it known that I, OSCAR BALLY, Ph. D., chemist, a citizen of the Swiss Republic, residing at Mannheim, Germany, have invented new and useful Improvements in Halogenated Vat Dyes and Processes of Making Same, of which the following is a specification.

It is known that by treating halogenated anthraquinones with thiosalicylic acid, intermediate condensation products can be obtained containing one or more than one thiosalicylic residue attached to each anthraquinone residue, and that these intermediate compounds, on further treatment with a condensing agent, give rise to vat coloring matters (see the specifications of British Letters Patent Nos. 13,907 and 30,480 A. D. 1909). These coloring matters are termed "anthraquinone thioxanthones." I have now found that, by treating these anthraquinone thioxanthones with halogen or with other halogenating agent, halogenated vat coloring matters can be obtained which have more vivid shades than those of the original coloring matters, while an alteration of shade generally takes place in the direction of from violet to red, and from red or orange to yellow. The same, or similar, halogenated coloring matters can be obtained if the intermediate condensation products be treated with halogen, or other halogenating agent, and the resulting halogenated intermediate products be afterward subjected to the action of a condensing agent so that the halogenated coloring matter is directly produced.

The following example will serve to illustrate further how this invention can be carried into practical effect, but my invention is not confined to this example. The parts are by weight. Suspend 3 parts of anthraquinone-1.5-dithioxanthone

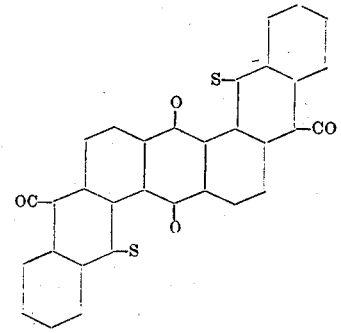

in 80 parts of nitrobenzene, add 3 parts of bromin and heat the whole, on the water-bath for 24 hours. Then filter off the bromin derivative, which has separated out, and wash it with nitrobenzene and alcohol and dry it. It consists of a red powder which dissolves in sulfuric acid, the solution being orange-red, and it is practically insoluble in alcohol, benzene, and nitrobenzene. It dyes cotton, from the vat, shades which are yellower than those obtained from the non-brominated product.

My new products differ from the coloring matters obtainable according to the British patents hereinbefore mentioned, in that they contain at least one halogen atom in a benzene ring which is attached to the anthraquinone residue. In addition they are insoluble in dilute acids and alkalis, soluble in concentrated sulfuric acid with a yellow to red color, and they dye cotton from a vat yellow-red shades, and in the sulfonated form dye wool from yellow to red shades.

Now what I claim is:—

1. The process of producing halogenated coloring matter of the anthracene series by treating an anthraquinone thioxanthone with a halogenating agent.

2. The process of producing halogenated coloring matter of the anthracene series by reacting with bromin on anthraquinone-1.5-di-thioxanthone.

3. As new articles of manufacture coloring matters being halogenated anthraquinone-thioxanthones which can be obtained by treating an anthraquinone thioxanthone with a halogenating agent, which new coloring matters contain at least one halogen atom in a benzene ring which is attached to the anthraquinone residue, are insoluble in dilute acids and alkalis, soluble in concentrated sulfuric acid with a yellow to red color, and dye cotton from a vat yellow-red shades, and in the sulfonated form dye wool from yellow to red shades.

4. As a new article of manufacture the halogenated coloring matter of the anthracene series which can be obtained by reacting with bromin on anthraquinone-1.5-dithioxanthone, which new coloring matter contains bromin in at least one benzene residue and consists when dry of a red powder which is insoluble in dilute acids and alkalis, but is soluble in concentrated sulfuric acid with an orange-red color, and which dyes cotton from the vat yellow-red shades which are yellower than those obtained from the non-brominated product.

In testimony whereof I have hereunto set my hand in the presence of two subscribing witnesses.

OSCAR BALLY.

Witnesses:
J. ALEC. LLOYD,
A. O. TITTMANN.

---

Copies of this patent may be obtained for five cents each, by addressing the "Commissioner of Patents, Washington, D. C."